US008897653B2

(12) United States Patent
Senoo et al.

(10) Patent No.: US 8,897,653 B2
(45) Date of Patent: Nov. 25, 2014

(54) LIGHT-EMISSION ERROR PREVENTING CIRCUIT FOR OPTICAL TRANSMITTER

(75) Inventors: Kenji Senoo, Tokyo (JP); Masaki Noda, Tokyo (JP); Shigeo Yamanaka, Tokyo (JP); Masatoshi Katayama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 387 days.

(21) Appl. No.: 13/382,562

(22) PCT Filed: Apr. 28, 2010

(86) PCT No.: PCT/JP2010/003052
§ 371 (c)(1),
(2), (4) Date: Jan. 6, 2012

(87) PCT Pub. No.: WO2011/024350
PCT Pub. Date: Mar. 3, 2011

(65) Prior Publication Data
US 2012/0128348 A1 May 24, 2012

(30) Foreign Application Priority Data
Aug. 24, 2009 (JP) ................... 2009-193165

(51) Int. Cl.
*H04B 10/04* (2006.01)
*H04B 10/40* (2013.01)

(52) U.S. Cl.
CPC ...................................... *H04B 10/40* (2013.01)
USPC .............. 398/192; 398/182; 398/183; 398/23

(58) Field of Classification Search
USPC .............. 398/182–201, 23, 22, 33; 372/9, 26, 372/29.01, 29.014, 29.015, 38.02, 38.07
See application file for complete search history.

(56) References Cited

U.S. PATENT DOCUMENTS

2006/0088322 A1 4/2006 Kobayashi et al.

FOREIGN PATENT DOCUMENTS

| JP | 9 243972 | 9/1997 | |
|---|---|---|---|
| JP | 09-243972 | * 9/1997 | ............... G02F 1/01 |
| JP | 11 046166 | 2/1999 | |
| JP | 2000 89178 | 3/2000 | |
| JP | 2004 032541 | 1/2004 | |
| JP | 2005 020192 | 1/2005 | |
| JP | 2006 121368 | 5/2006 | |
| JP | 2006 197447 | 7/2006 | |
| JP | 2007 194983 | 8/2007 | |
| JP | 2007 318524 | 12/2007 | |
| JP | 2009 159034 | 7/2009 | |
| JP | 2010 4356 | 1/2010 | |

OTHER PUBLICATIONS

International Search Report issued on Aug. 3, 2010 in PCT/JP10/003052 filed on Apr. 28, 2010.

* cited by examiner

*Primary Examiner* — M. R. Sedighian
(74) *Attorney, Agent, or Firm* — Oblon, Spivak, McClelland, Maier & Neustadt, L.L.P.

(57) ABSTRACT

A subscriber-side optical network unit (ONU) includes a control LSI for outputting a data signal and a pre-bias signal at fixed intervals, an optical transmitter-receiver for producing optical output in response to these signals, and a light-emission error preventing circuit for preventing light-emission error. First and second light-emission error detecting circuits output an abnormality detection alarm signal when no rising edge occurs in the data signal and pre-bias signal for a prescribed period of time. An OR element, when receiving the abnormality detection alarm signal from at least one of the first and second light-emission error detecting circuits, supplies the optical transmitter-receiver with a shutdown signal and halts the optical output.

8 Claims, 4 Drawing Sheets

(a) Normal State: Data (b) Normal State: Prebias (c) Normal State: Optical Output (d) Abnormal State: Data (e) Abnormal State: Prebias (f) Abnormal State: Optical Output (g) During Circuit Operation: Alarm Output of Light-emission Error Detecting Circuit (h) During Circuit Operation: ShutDown (i) During Circuit Operation: Optical Output

US 8,897,653 B2

LIGHT-EMISSION ERROR PREVENTING CIRCUIT FOR OPTICAL TRANSMITTER

TECHNICAL FIELD

The present invention relates to a light-emission error preventing circuit for preventing a light-emission error of an optical transmitter-receiver mounted on a subscriber-side optical network unit (ONU) of a GEPON system (Gigabit Ethernet Passive Optical Network System/Ethernet is a registered trademark).

BACKGROUND ART

A GEPON system is a fiber-optic subscriber system such as an FTTB (Fiber To The Building), or a fiber-optic subscriber access network system that provides a subscriber with an Internet service with a maximum transmission rate of 1 gigabit/second or 2.5 gigabits/second such as an FTTH (Fiber To The Home). The GEPON system comprises a station-side optical line terminal (OLT) installed in a central station, an optical branching device for splitting a transmission line into a maximum of 32 to 64, and a subscriber-side optical network unit (ONU) installed in a subscriber's home. A 1310 nm band wavelength is assigned to an upstream digital data signal which is transmitted from the subscriber-side optical network unit (ONU) to the station-side optical line terminal (OLT). On the other hand, a 1490 nm band wavelength is assigned to a downstream digital data signal or the like (inclusive of a digital voice signal) which is transmitted from the station-side optical line terminal (OLT) to the subscriber-side optical network unit (ONU), and a 1550 nm band wavelength is assigned to a downstream video signal (inclusive of an analog video signal). In this way, it carries out single-core bidirectional optical communication, which transmits the upstream wavelength and downstream wavelength through a single fiber, by using wavelength division multiplexing (WDM) capable of assigning multiple wavelengths.

As for the upstream 1310 nm band optical signal, the GEPON system, using a group called a packet or cell as a unit, controls its transmission timing in such a manner that the packets or cells arrive at the station-side optical line terminal (OLT) at different timings without overlapping each other, thus transmitting them from each subscriber-side optical network unit (ONU). Then, the upstream optical signals from the individual subscriber-side optical network units (ONU) are simply multiplexed with a multiplexer/demultiplexer like an optical splitter, and are supplied to the station-side optical line terminal (OLT).

Accordingly, the GEPON system has a problem in that if a subscriber-side optical network unit (ONU) emits light at timing other than the regular optical signal transmission timing, the station-side optical line terminal (OLT) cannot receive correctly because of a collision with an upstream optical signal of other subscriber-side optical network unit (ONU). In particular, if it makes a light-emission error continuously, it will interfere with communications of all the subscriber-side optical network units (ONU) connected to the same station-side optical line terminal (OLT).

Generally, the transmitter unit of an optical transmitter-receiver used for a subscriber-side optical network unit (ONU) of a GEPON system transmits an optical signal in response to a driving signal such as an input data signal (digital data signal itself to be transmitted) and a pre-bias signal (signal indicating duration in which the subscriber-side optical network unit (ONU) has its own transmission right). As for these data signal and pre-bias signal, although a control LSI such as a PON-LSI (Large Scale Integration) outputs them, if the control LSI goes out of order and if the potential of at least one of the data signal and pre-bias signal is brought to a "High" level fixed state (referred to as High-fixed state from now) or to an indefinite potential state, the optical transmitter-receiver emits light continuously, thereby transmitting the optical signal at erroneous timing.

Thus, Patent Document 1, for example, discloses a light-emission error preventing circuit for preventing the light-emission error of the subscriber-side optical network unit (ONU). The light-emission error preventing circuit, using a photo-detector such as a monitor photodiode for detecting an optical output interruption, detects as a light-emission detecting signal the light emission of a light-emitting element like a laser diode that emits light in response to the driving signal, makes a matching/mismatching decision by comparing the light-emission detecting signal with the driving signal, and makes a light-emission error decision in the case of mismatching.

PRIOR ART DOCUMENT

Patent Document

Patent Document 1: Japanese Patent Laid-Open No. 2006-197447.

DISCLOSURE OF THE INVENTION

With the foregoing configuration, the conventional light-emission error preventing circuit has problems of making it necessary to arrange high-speed photo-detectors accurately to enable monitoring the optical signal to be transmitted from the optical transmitter-receiver correctly, of increasing the number of costly components and of requiring accurate assembling. In addition, it necessitates a complicated electrical circuit for making a matching/mismatching decision between the light-emission detecting signal and the driving signal.

In contrast with this, when using, as the photo-detectors, ordinary low-speed monitor photodiodes for detecting the interruption of the optical output to reduce the cost of the light-emission error detecting circuit, their outputs become a signal that averages the light-emission detecting signal. This offers a problem of being unable to detect a light-emission error because it cannot distinguish between the normal light-emitting state and the light-emission error state at a halfway light-emitting level.

The present invention is implemented to solve the foregoing problems. Therefore it is an object of the present invention to provide a light-emission error preventing circuit capable of detecting a light-emission error state by using a cheaper, simpler logic IC (Integrated Circuit) in place of the costly photo-detectors and the complicated decision circuit.

A light-emission error preventing circuit in accordance with the present invention comprises a light-emission error detecting circuit for pre-bias for monitoring a pre-bias signal, and for outputting an abnormality detection alarm signal when no modulation occurs for a prescribed period of time; and a forcedly-stopping unit for halting, when receiving the abnormality detection alarm signal from the light-emission error detecting circuit for pre-bias, the optical output of the optical transmitter.

According to the present invention, it halts the optical output of the optical transmitter when no rising edge of the pre-bias signal occurs for a prescribed period of time. Accordingly, it does not require a costly photo-detector and complicated decision circuit, and can prevent the light-emission error state using a cheaper, simpler logic IC.

EMBODIMENTS FOR CARRYING OUT THE INVENTION

The best mode for carrying out the invention will now be described with reference to the accompanying drawings to explain the present invention in more detail.

Embodiment 1

Figure 1:
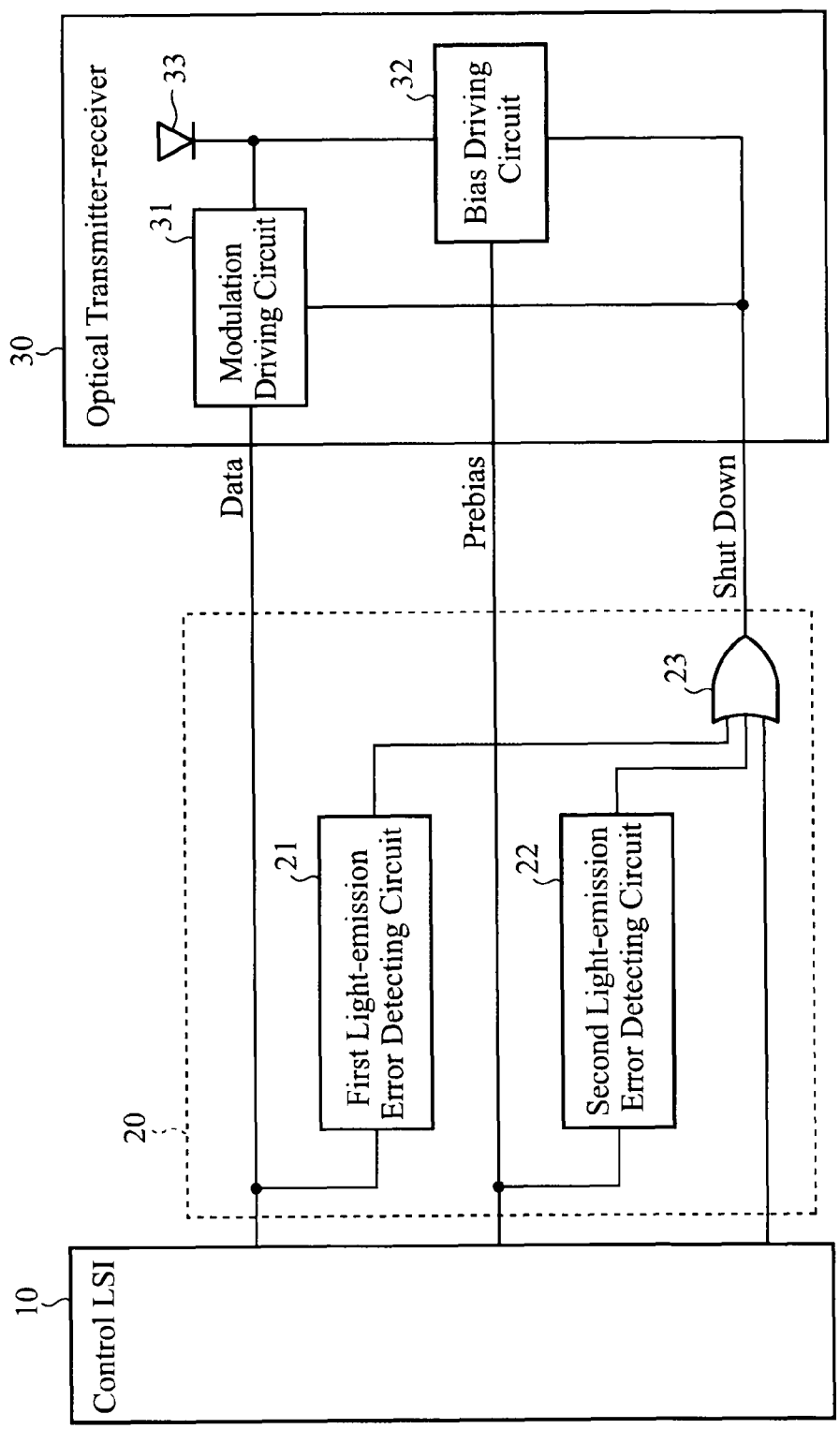
FIG. 1 is a block diagram showing a configuration of a subscriber-side optical network unit (ONU) of an embodiment 1 in accordance with the present invention.

FIG. 1 is a block diagram showing a configuration of a subscriber-side optical network unit (ONU) of an embodiment 1 in accordance with the present invention, which shows in particular a configuration between a control LSI 10, a light-emission error preventing circuit 20, and an optical transmitter-receiver 30. In the example, a station-side optical line terminal (OLT) of a GEPON system issues a transmission right to its subordinate subscriber-side optical network unit (ONU) shown in FIG. 1. In addition, it has such a configuration that the subscriber-side optical network unit (ONU) transmits, even if it does not have any data to be transmitted, a report indicating that there is no transmission data to the station-side optical line terminal (OLT) at regular intervals.

In FIG. 1, the control LSI 10 outputs a data signal (Data of FIG. 1) and a pre-bias signal (Prebias of FIG. 1), which become a driving signal for driving a light-emitting element (referred to as "LD" from now on) 33 such as a laser diode mounted on the optical transmitter-receiver 30, at regular intervals. Here, the term "data signal" refers to a digital data signal itself to be transmitted to the station-side optical line terminal (OLT), and the term "pre-bias signal" refers to a signal for controlling a bias current in such a manner as to flow through the LD 33 while the subscriber-side optical network unit (ONU) has its own transmission right. As described above, when there is no data to be transmitted, the data signal becomes a signal indicating that there is no transmission data. In addition, the control LSI 10 supplies the optical transmitter-receiver 30 with a shutdown signal (ShutDown of FIG. 1) for forcing the optical transmitter-receiver 30 to stop its light emission.

The optical transmitter-receiver 30 comprises a modulation driving circuit 31 for supplying a driving current corresponding to the data signal to the LD 33 to emit light, a bias driving circuit 32 for supplying a bias current corresponding to the pre-bias signal to the LD 33 to emit light, and the LD 33, converts the electric signal which is the upstream digital data signal to an optical signal with a 1310 nm band wavelength, and transmits to the station-side optical line terminal (OLT).

In addition, even if the data signal or bias signal is being input, the modulation driving circuit 31 and bias driving circuit 32 force the LD 33 to stop light emission if the shutdown signal is input at the period of time. Furthermore, although not shown in FIG. 1, the optical transmitter-receiver 30 has functions of receiving the optical signal transmitted from the station-side optical line terminal (OLT) and of converting it to an electric signal.

The light-emission error preventing circuit 20 comprises a first light-emission error detecting circuit (light-emission error detecting circuit for data) 21 for detecting abnormality of the data signal, a second light-emission error detecting circuit (light-emission error detecting circuit for pre-bias) 22 for detecting abnormality of the pre-bias signal, and an OR element (forcedly-stopping unit) 23 for carrying out logical OR operation of abnormality detection alarm signals of the first and second light-emission error detecting circuits 21 and 22 and for outputting the shutdown signal.

The first light-emission error detecting circuit 21 is inserted into a shunt from the line for the data signal which connects the control LSI 10 to the modulation driving circuit 31. The first light-emission error detecting circuit 21 comprises a one-shot multivibrator IC. The one-shot multivibrator IC detects a rising edge of the modulation of the data signal input from the control LSI 10 at regular intervals, and outputs a signal with a fixed length. If the signal with the fixed length breaks, the first light-emission error detecting circuit 21 makes a decision that the data signal becomes one of High-fixed, Low-fixed, and indefinite potential fixed states because of trouble or a malfunction, and supplies the OR element 23 with an abnormality detection alarm signal.

The second light-emission error detecting circuit 22 is inserted into a shunt from the line for the pre-bias signal which connects the control LSI 10 to the bias driving circuit 32. As the first light-emission error detecting circuit 21, the second light-emission error detecting circuit 22 comprises a one-shot multivibrator IC. The one-shot multivibrator IC detects a rising edge of the modulation of the pre-bias signal input from the control LSI 10 at regular intervals, and outputs a signal with a fixed length. If the signal with the fixed length breaks, the second light-emission error detecting circuit 22 makes a decision that the pre-bias signal becomes one of High-fixed, Low-fixed, and indefinite potential fixed states because of trouble or a malfunction, and supplies the OR element 23 with an abnormality detection alarm signal.

If the one-shot multivibrator ICs are ordinary one, it is enough to set the pulse width of its output signal by a combination of a resistor and a capacitor at a maximum time between the rising edges estimated from the requirement of the system, that is, the maximum time taken for transmitting a report from the subscriber-side optical network unit (ONU) to the station-side optical line terminal (OLT) of the GEPON system.

Incidentally, as the one-shot multivibrator IC of each of the first light-emission error detecting circuit 21 and second light-emission error detecting circuit 22, it can be replaced by a circuit element that can detect the rising edges and falling edges of the data signal and pre-bias signal.

The OR element 23 is inserted into a line for the shutdown signal, which connects the control LSI 10 to the optical transmitter-receiver 30, and is supplied with the shutdown signal from the control LSI 10. In addition, the OR element 23 is connected to the output lines of the first and second light-emission error detecting circuits 21 and 22 to receive the abnormality detection alarm signals. When the abnormality detection alarm signal of at least one of the first and second light-emission error detecting circuits 21 and 22 is supplied, the OR element 23 supplies the shutdown signal to the optical transmitter-receiver 30 to perform shutdown control.

Figure 2:
FIG. 2 is a waveform diagram showing outputs of various units under normal and abnormal conditions of the subscriber-side optical network unit (ONU) of the embodiment 1 in accordance with the present invention.
Figure 2:
Figure 2:
Figure 2:
Figure 2:
Figure 2:
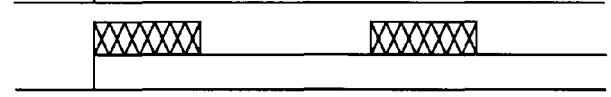
Figure 2:
Figure 2:
Figure 2:
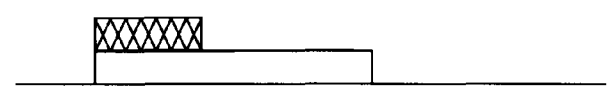

Next, the operation of the light-emission error preventing circuit 20 will be described. FIG. 2 is a waveform diagram showing outputs of various units of the subscriber-side optical network unit (ONU) shown in FIG. 1: FIG. 2(a)-2(c) show a case where both the data signal and pre-bias signal are normal; FIG. 2(d)-2(f) show a case where an abnormality occurs in the pre-bias signal; and FIG. 2(g)-2(h) show a case where the light-emission error preventing circuit 20 operates when the pre-bias signal is in the abnormal state.

As shown in FIG. 2(a) and FIG. 2(b), when the control LSI 10 outputs the data signal and pre-bias signal normally at regular intervals, the optical transmitter-receiver 30 outputs light normally at the regular intervals in response to these signals as shown in FIG. 2(c).

As shown in FIG. 2(d) and FIG. 2(e), when the control LSI 10 outputs the data signal normally at regular intervals, but the pre-bias signal in a High-fixed state without any modulation for more than a fixed time period, and if the light-emission error preventing circuit 20 is not employed, the optical transmitter-receiver 30 comes to output light continuously at the maximum output as shown in FIG. 2(f). The light-emission error can bring about interference with communication of other subscriber-side optical network unit (ONU).

When the light-emission error preventing circuit 20 is provided, and if the pre-bias signal is in the High-fixed state as shown in FIG. 2(e), the second light-emission error detecting circuit 22 supplies the OR element 23 with the abnormality detection alarm signal as shown in FIG. 2(g) when the fixed-time output of the one-shot multivibrator IC is interrupted because no modulation occurs for more than the fixed time period and the rising edge cannot be detected. Receiving the abnormality detection alarm signal from the second light-emission error detecting circuit 22, the OR element 23 supplies the shutdown signal to the optical transmitter-receiver 30 as shown in FIG. 2(h). Receiving the shutdown signal from the OR element 23, the optical transmitter-receiver 30 forces the LD 33 to stop emitting light as shown in FIG. 2(i), thereby halting the light-emission error state.

Incidentally, the light-emission error preventing circuit 20 can forcedly stop the light-emission error state not only in the abnormality in the High-fixed state of the pre-bias signal as shown in FIG. 2(e), but also in the Low-fixed or indefinite potential fixed state, and can forcedly stop at an abnormality of the data signal as well.

As described above, according to the embodiment 1, it is configured in such a manner that the subscriber-side optical network unit (ONU), which includes the control LSI 10 for outputting the data signal and pre-bias signal at a fixed period, and the optical transmitter-receiver 30 for outputting light in response to these signals, comprises the light-emission error preventing circuit 20 which includes the first light-emission error detecting circuit 21 for monitoring the data signal and for outputting the abnormality detection alarm signal if no modulation occurs for a prescribed period of time, the second light-emission error detecting circuit 22 for monitoring the pre-bias signal and for outputting the abnormality detection alarm signal if no modulation occurs for a prescribed period of time, and the OR element 23 for outputting the shutdown signal for preventing the optical transmitter-receiver 30 from outputting light when the abnormality detection alarm signal is supplied from at least one of the first and second light-emission error detecting circuits 21 and 22.

Accordingly, if some trouble or a malfunction is detected in either of the signals by monitoring the data signal with the first light-emission error detecting circuit 21 and the pre-bias signal with the second light-emission error detecting circuit 22 independently, it can stop the light-emission error state immediately by carrying out shutdown control of the optical transmitter-receiver 30. In addition, since the light-emission error preventing circuit 20 can detect not only the High-fixed or Low-fixed abnormal state of the data signal and pre-bias signal, but also the indefinite potential fixed abnormal state, it can prevent the light-emission error including continuous light emission at an indefinite optical output level. Furthermore, since it does not require a costly photo-detector and complicated decision circuit, it can realize the light-emission error preventing circuit 20 with a cheaper, simpler logic IC.

In addition, according to the embodiment 1, the first light-emission error detecting circuit 21 is configured in such a manner that it has a one-shot multivibrator IC for outputting a signal with a fixed length when detecting the rising edge of the data signal and that when the signal the one-shot multivibrator IC outputs breaks, it outputs the abnormality detection alarm signal. Likewise, the second light-emission error detecting circuit 22 is configured in such a manner that it has a one-shot multivibrator IC for outputting a signal with a fixed length when detecting the rising edge of the pre-bias signal and that when the signal the one-shot multivibrator IC outputs breaks, it outputs the abnormality detection alarm signal. Since the one-shot multivibrator ICs are cheap and simple, they make it possible to implement a cheap and simple light-emission error preventing circuit 20.

Embodiment 2

Figure 3:
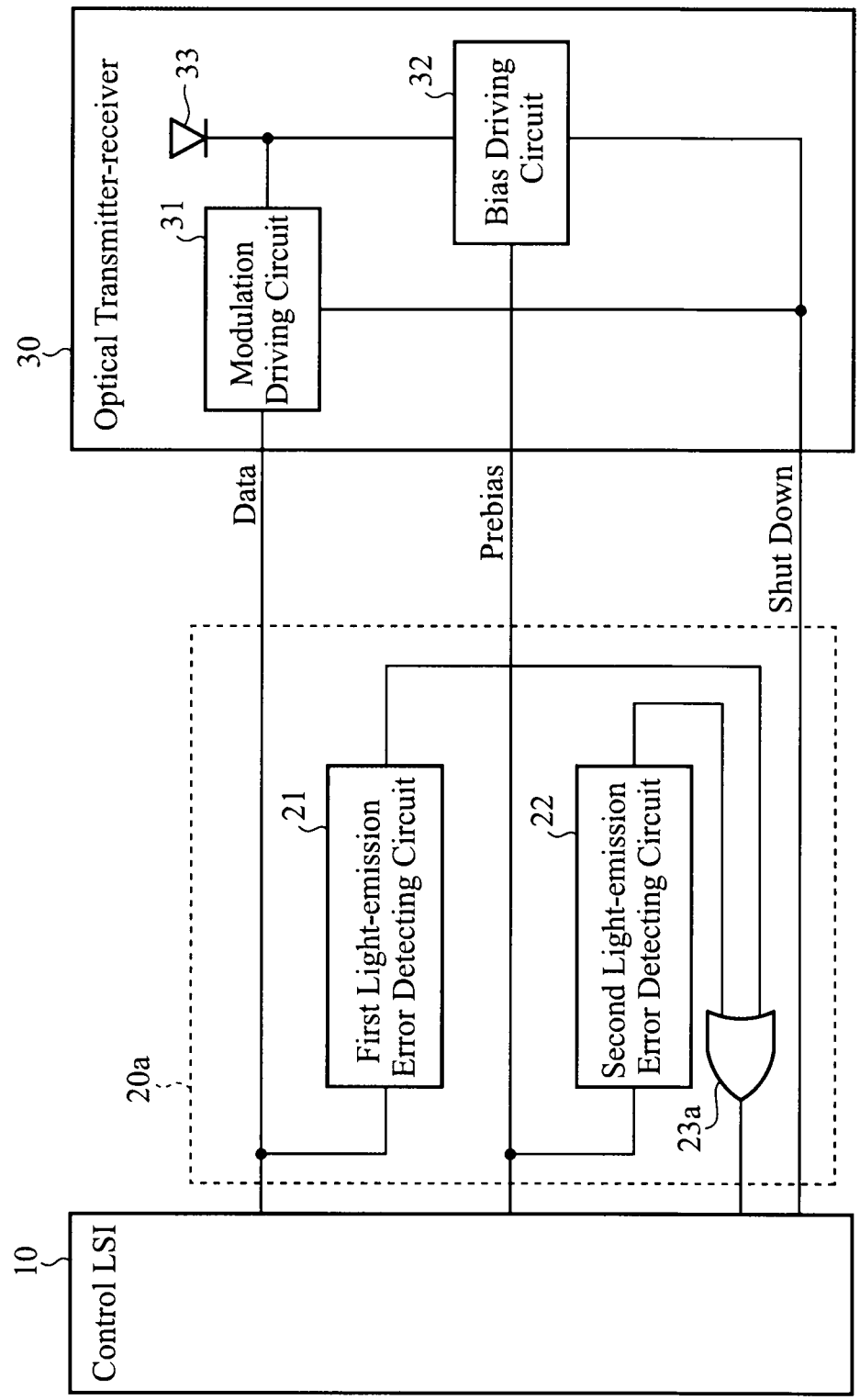
FIG. 3 is a block diagram showing a configuration of a subscriber-side optical network unit (ONU) of an embodiment 2 in accordance with the present invention.

FIG. 3 is a block diagram showing a configuration of a subscriber-side optical network unit (ONU) of an embodiment 2, in which the same or like components to those of FIG. 1 are designated by the same reference numerals and their description will be omitted. The light-emission error preventing circuit 20a of the present embodiment 2 comprises an OR element 23a instead of the OR element 23 of the light-emission error preventing circuit 20 of the foregoing embodiment 1. In addition, the connection line for the shutdown signal of the control LSI 10 is directly connected to the optical transmitter-receiver 30.

In FIG. 3, the OR element 23a is supplied with the abnormality detection alarm signals via the output lines of the first and second light-emission error detecting circuits 21 and 22 connected thereto. If the OR element 23a receives at least one of the abnormality detection alarm signals of the first and second light-emission error detecting circuits 21 and 22, it supplies the control LSI 10 with the light-emission error detection alarm signal.

Receiving the light-emission error detection alarm signal from the OR element 23a, the control LSI 10 supplies the optical transmitter-receiver 30 with the shutdown signal to carry out shutdown control. Thus forcedly stopping the optical output via the control LSI 10 if the light-emission error preventing circuit 20a detects the light-emission error makes it possible to set conditions for the shutdown control in more detail by software or the like. Incidentally, in the present embodiment 2, the OR element 23a and the control LSI 10 constitute a forcedly-stopping unit.

As described above, according to the embodiment 2, it is configured in such a manner that when receiving the abnormality detection alarm signal from at least one of the first and second light-emission error detecting circuits 21 and 22, the OR element 23a supplies the light-emission error detection alarm signal to the control LSI 10, and that when receiving the light-emission error detection alarm signal, the control LSI 10 stops the optical output of the optical transmitter-receiver 30.

Accordingly, it can set the conditions for the shutdown control in more detail in addition to the advantages of the foregoing embodiment 1 by using the light-emission error preventing circuit 20a.

Embodiment 3

Figure 4:
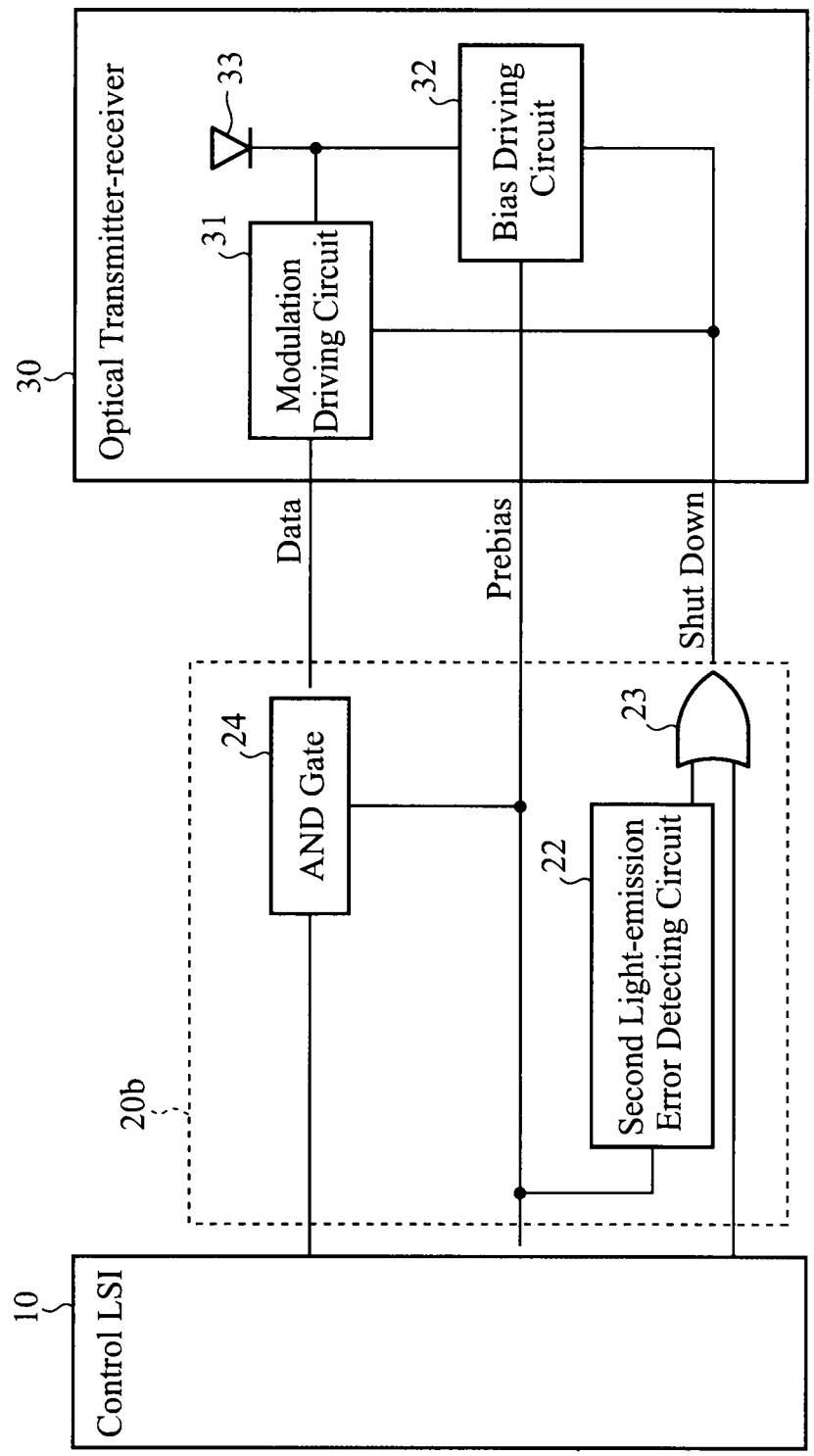
FIG. 4 is a block diagram showing a configuration of a subscriber-side optical network unit (ONU) of an embodiment 3 in accordance with the present invention.

FIG. 4 is a block diagram showing a configuration of a subscriber-side optical network unit (ONU) of an embodiment 3, in which the same or like components to those of FIG. 1 are designated by the same reference numerals and their description will be omitted. The light-emission error preventing circuit 20b of the present embodiment 3 comprises an AND gate 24 instead of the first light-emission error detecting circuit 21 of the light-emission error preventing circuit 20 of the foregoing embodiment 1. In addition, the OR element 23 uses as its input only the abnormality detection alarm signal from the second light-emission error detecting circuit 22, and supplies, when receiving the abnormality detection alarm signal from the second light-emission error detecting circuit 22, the shutdown signal to the optical transmitter-receiver 30.

In FIG. 4, the AND gate 24 is inserted into the line for the data signal which connects the control LSI 10 to the modulation driving circuit 31, and uses as its input a shunt from the line for the pre-bias signal which connects the control LSI 10 to the bias driving circuit 32. The AND gate 24 supplies the data signal to the modulation driving circuit 31 only during the interval that the pre-bias signal is being input.

According to the subscriber-side optical network unit (ONU) having the light-emission error preventing circuit 20b of the present embodiment 3, even if the data signal becomes a High-fixed, Low-fixed, or indefinite potential fixed state because of trouble or a malfunction, unless the pre-bias signal output from the control LSI 10 at regular intervals is supplied to the AND gate 24, the data signal is not supplied to the optical transmitter-receiver 30. Thus, the optical transmitter-receiver 30 outputs light only during the interval indicated by the transmission right the station-side optical line terminal (OLT) issues. Accordingly, it has no effect on the communications of all the other subscriber-side optical network units (ONU) which are connected and subordinate to the same station-side optical line terminal (OLT).

Shortly after, since the station-side optical line terminal (OLT) cannot detect a report to be transmitted at regular intervals from the subscriber-side optical network unit (ONU), it makes a decision that trouble occurs, and stops the issuance of the transmission right to the subscriber-side optical network unit (ONU).

Then, receiving the transmission right issuance stop, the control LSI 10 of the subscriber-side optical network unit (ONU) halts the optical output.

However, when the pre-bias signal becomes the High-fixed, Low-fixed, or indefinite potential fixed state because of trouble or a malfunction, it cannot prevent the AND gate 24 from outputting the data signal. Accordingly, the second light-emission error detecting circuit 22 detects the unmodulated state of the pre-bias signal, and supplies the abnormality detection alarm signal to the OR element 23 so that the OR element 23 supplies the optical transmitter-receiver 30 with the shutdown signal to halt the light-emission error.

As described above, according to the embodiment 3, it is configured in such a manner that the subscriber-side optical network unit (ONU), which includes the control LSI 10 for outputting the data signal and pre-bias signal at fixed periods, and the optical transmitter-receiver 30 for outputting light in response to these signals, comprises the light-emission error preventing circuit 20b which includes the second light-emission error detecting circuit 22 for monitoring the pre-bias signal and for outputting the abnormality detection alarm signal if no modulation occurs for a prescribed period of time, the OR element 23 for outputting the shutdown signal for preventing the optical transmitter-receiver 30 from outputting light when the abnormality detection alarm signal is supplied from the second light-emission error detecting circuit 22, and the AND gate 24 for supplying the data signal to the optical transmitter-receiver 30 during the interval that the pre-bias signal is input.

Accordingly, even if trouble or a malfunction occurs in the data signal, the light-emission error preventing circuit 20b outputs the data signal only during the interval that the AND gate 24 is receiving the pre-bias signal, thereby being able to prevent the light-emission error from having effect on the communications of other subscriber-side optical network units (ONU). In addition, when trouble or a malfunction occurs in the pre-bias signal, it can stop a light-emission error state by carrying out shutdown control immediately. Furthermore, since it does not require a costly photo-detector and complicated decision circuit, it can implement a light-emission error preventing circuit 20b using a cheaper, simpler logic IC.

Incidentally, although the foregoing embodiment 3 has a configuration in which the light-emission error preventing circuit 20b has the AND gate 24, there are some cases where the optical transmitter-receiver 30 has the AND gate 24 depending on the configuration of the optical transmitter-receiver 30. As for the configuration, it is enough of the light-emission error preventing circuit 20b to have only the second light-emission error detecting circuit 22 and OR element 23. Thus, it can achieve the advantage of preventing the light-emission error more simply.

In addition, although the foregoing embodiment 3 has a configuration in which the OR element 23 supplies the shutdown signal to the optical transmitter-receiver 30, a configuration is also possible which supplies the light-emission error detection alarm signal to the control LSI 10 once just as the OR element 23a of the foregoing embodiment 2 so that the control LSI 10 supplies the optical transmitter-receiver 30 with the shutdown signal. In the configuration, it can set conditions for the shutdown control in more detail using software or the like as in the foregoing embodiment 2.

Incidentally, in the foregoing embodiments 1-3, as long as the light-emission error preventing circuit 20, 20a or 20b has a configuration that includes at least the light-emission error detecting circuit for pre-bias (second light-emission error detecting circuit 22) for monitoring the pre-bias signal, and the forcedly-stopping unit (control LSI 10 and OR element 23 or 23a) for halting the light emission of the optical transmitter-receiver 30, it can prevent the light-emission error from affecting communications of other subscriber-side optical network units (ONU). Accordingly, the first light-emission error detecting circuit 21 or AND gate 24 can be removed. In this case, since the optical output of the optical transmitter is stopped when the rising edge of the pre-bias signal does not occur for a prescribed period of time, it does not require the costly photo-detector and complicated decision circuit as in the foregoing embodiments 1-3. Accordingly, it has an advantage of being able to detect and prevent the light-emission error state using a cheaper, simpler logic IC.

INDUSTRIAL APPLICABILITY

A light-emission error preventing circuit for an optical transmitter in accordance with the present invention can detect and prevent a light-emission error state using a cheaper, simpler logic IC without requiring a costly photodetector and complicated decision circuit. Accordingly, it is suitable for applications to a subscriber-side optical network unit of a GEPON system or the like.

What is claimed is:

1. A light-emission error preventing circuit for an optical transmitter having a light-emitting element that optically outputs a data signal at fixed intervals according to a pre-bias signal that controls an operation of the optical transmitter, the light-emission error preventing circuit for the optical transmitter comprising:
   a light-emission error detecting circuit for pre-bias that monitors the pre-bias signal that controls the operation of the optical transmitter and outputs an abnormality detection alarm signal when no modulation occurs for a prescribed period of time in the pre-bias signal that controls the operation of the optical transmitter; and
   a forcedly-stopping unit for halting, when receiving the abnormality detection alarm signal from the light-emission error detecting circuit for pre-bias, the optical output of the optical transmitter.

2. The light-emission error preventing circuit for the optical transmitter according to claim 1, further comprising:
   a light-emission error detecting circuit for data for monitoring the data signal and for outputting an abnormality detection alarm signal when no modulation occurs for a prescribed period of time, wherein
   the forcedly-stopping unit halts the optical output of the optical transmitter when it receives the abnormality detection alarm signal from at least one of the light-emission error detecting circuit for data and the light-emission error detecting circuit for pre-bias.

3. The light-emission error preventing circuit for the optical transmitter according to claim 1, further comprising:
   an AND gate for supplying the data signal to the optical transmitter during an interval that the pre-bias signal is being input.

4. The light-emission error preventing circuit for the optical transmitter according to claim 1, wherein
   the light-emission error detecting circuit for pre-bias comprises a one-shot multivibrator IC (Integrated Circuit) for outputting a fixed length signal when detecting a rising edge of the pre-bias signal, and for outputting the abnormality detection alarm signal when the signal the one-shot multivibrator IC outputs is interrupted.

5. The light-emission error preventing circuit for the optical transmitter according to claim 2, wherein
   the light-emission error detecting circuit for data comprises a one-shot multivibrator IC (Integrated Circuit) for outputting a fixed length signal when detecting a rising edge of the data signal, and for outputting the abnormality detection alarm signal when the signal the one-shot multivibrator IC outputs is interrupted.

6. The light-emission error preventing circuit for the optical transmitter according to claim 2, wherein
   the forcedly-stopping unit comprises an OR element for supplying the optical transmitter with a shutdown signal for halting the optical output of the optical transmitter when receiving the abnormality detection alarm signal from at least one of the light-emission error detecting circuit for data and the light-emission error detecting circuit for pre-bias.

7. The light-emission error preventing circuit for the optical transmitter according to claim 2, further comprising:
   a control LSI (Large Scale Integration) for halting the optical output of the optical transmitter, wherein
   the forcedly-stopping unit comprises an OR element for supplying the control LSI with a light-emission error detection alarm signal when receiving the abnormality detection alarm signal from at least one of the light-emission error detecting circuit for data and the light-emission error detecting circuit for pre-bias; and
   the control LSI halt the optical output of the optical transmitter when receiving the light-emission error detection alarm signal from the forcedly-stopping unit.

8. A light-emission error preventing circuit for an optical transmitter having a light-emitting element for optically outputting a data signal at fixed intervals a pre-bias signal generates, the light-emission error preventing circuit for the optical transmitter comprising:
   a light-emission error detecting circuit for pre-bias for monitoring the pre-bias signal, and for outputting an abnormality detection alarm signal when no modulation occurs for a prescribed period of time; and
   a forcedly-stopping unit for halting, when receiving the abnormality detection alarm signal from the light-emission error detecting circuit for pre-bias, the optical output of the optical transmitter,
   wherein the light-emission error detecting circuit for pre-bias comprises a one-shot multivibrator IC (Integrated Circuit) for outputting a fixed length signal when detecting a rising edge of the pre-bias signal, and for outputting the abnormality detection alarm signal when the signal the one-shot multivibrator IC outputs is interrupted.

* * * * *